United States Patent Office 3,423,372
Patented Jan. 21, 1969

3,423,372
POLYLACTAMS PRODUCED BY THE ANIONIC POLYMERIZATION OF HIGHER LACTAMS USING POLYMETHYLENE POLYPHENYL ISOCYANATE AS PROMOTER
Norman E. Steely, Reading, Pa., assignor to The Polymer Corporation, Reading, Pa., a corporation of Pennsylvania
No Drawing. Continuation-in-part of application Ser. No. 264,055, Mar. 11, 1963. This application Mar. 22, 1967, Ser. No. 625,027
U.S. Cl. 260—78
Int. Cl. C08g 20/10
3 Claims

ABSTRACT OF THE DISCLOSURE

Polylactams having a high tensile impact strengths are prepared by the anionic polymarization of higher lactams in the presence of a polymethylene polyphenyl isocyanate.

This application is a continuation-in-part of my copending application Ser. No. 264,055, filed Mar. 11, 1963, and now abandoned.

This invention relates to the low temperature anionic polymerization of higher lactams and the products thereby obtained. More particularly, this invention relates to a polylactam having high tensile impact strength and a method for its production.

It is an object of this invention to prepare a polylactam having a high tensile impact strength.

Another object of this invention is to prepare a polylactam article having a high tensile impact strength without causing an attendant loss in tensile strength.

Briefly, the objects of this invention are achieved by utilizing an polymethylene polyphenyl isocyanate as a promoter in the base-catalyzed polymerization of lactams. It has been found that the use of this promoter greatly increases the tensile impact strength of the polylactam and that the tensile strength is not appreciably lowered and may even increase compared with polylactams prepared using conventional promoters.

The low temperature anionic polymerization of lactams referred to above is discolsed, for example, in U.S. Patents 3,015,652; 3,017,391; 3,017,392 and 3,018,273.

Briefly, the above patents disclose the novel polymerization of higher lactams, i.e., lactams containing at least 6 carbon atoms in the lactam ring, as for example, e-caprolactam, enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, proply sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound, which in the instant invention is a polymethylene polyphenyl isocyanate.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still, from about 0.1 to about 1 mole percent, all based on the higher lactam being polymerized. The higher lactams preferably contain from 6 to 20 carbon atoms, and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable, as it permits ready removal of hydrogen gas from the system as when sodium or sodium hydride is employed, removal of water as when sodium hydroxide is employed, removal of water and carbon dioxide as when sodium carbonate is employed, etc.

It has been recognized in the prior art that the tensile impact strength of the various polyamides, including the polylactams, can be increased. Typical methods for accomplishing this include the plasticization of polyamides, as, for example, by leaving residual amounts of monomer in polymerized polyamides. However, all attempts in the prior art of increase the tensile impact strength have resulted in a decrease in the tensile strength of the polyamide. Thus, improved tensile impact strength must be obtained at a sacrifice of other properties, such as tensile strength.

It has now been discovered that if polymethylene polyphenyl isocyanate is used as a promoter in the anionic polymerization of higher lactams, a polylactam having greatly increased impact strength can be obtained without appreciable loss, if any, of tensile strength.

The polymethylene polyphenyl isocyanates that have been found useful in the practice of this invention may generally be represented by the following formula:

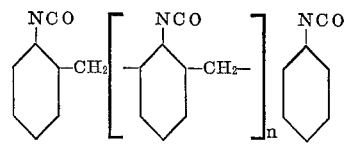

wherein $n$ may average from about ½ up to about 8 and preferably about 1 to about 3. Generally, the greater the value of $n$, the greater will be the beneficial increase in the tensile impact properties of the polylactam. However, as a practical matter, it is not possible to utilize polymethylene polyphenyl isocyanates in which $n$ is greater than about 6 or 8 due to the fact that the isocyanate becomes self-polymerizing and will polymerize with itself rather than perform the function of a promoter in the lactam polymerization.

The quantity of polymethylene polyphenyl isocyanate used may vary over a fairly wide range of from about 0.01 to about 20 mole percent based on the higher lactam being polymerized. A more preferred range will vary from about 0.2 to about 2 mole percent.

The polymerization product obtained by the use of the polymethylene polyphenyl isocyanate as a promoter does not have an ordered structure but is considerably cross-linked and is not soluble.

In the following examples, a polymethylene polyphenyl isocyanate was used in which $n$ was approximately 1. This particular isocyanate is commercially available and is sold under the trademark "PAPI".

The tensile impact strengths in the examples are given in foot pounds per square inch and were obtained using ASTM (American Society for Testing Materials) Test Method D–256. Essentially, this test comprises placing a bone-dry test specimen in a chuck directly under the pivot point of a weighted pendulum and then releasing the pendulum from a sufficient height to fracture the specimen.

Example I

A 1/800 molar quantity of sodium hydride catalyst and a 1/200 motor quantity of tolylene diisocyanate promoter were added to ε-caprolactam. This mixture was polymerized by initiating the reaction at about 160° C. The tensile impact strength of the polymerized product averaged about 80 ft. lbs./sq. in. and the tensile strength was about 11,000 lbs./sq. in.

Example II

The experiment of Example I was repeated substituting polymethylene polyphenyl isocyanate for the tolylene diisocyanate promoter. The tensile impact of the resulting polymer was about 157 ft. lbs./sq. in. and the tensile strength was 10,000 lbs./sq. in.

Example III

A 1/200 molar quantity of phenyl magnesium bromide catalyst and a 1/200 molar quantity of tolylene diisocyanate promoter were added to ε-caprolactam. This mixture was polymerized by initiating the reaction at about 160° C. The tensile impact strength of the resulting polycaprolactam article was about 110 ft. lbs./sq. in. and the tensile strength was about 11,000 lbs./sq. in.

Example IV

The experiment of Example III was repeated substituting polymethylene polyphenyl isocyanate for the tolylene diisocyanate promoter. The tensile impact strength of the resulting polycaprolactam article was about 202 ft. lbs./sq. in. and the tensile strength was about 12,500 lbs./sq. in.

Example V

The experiment of Example IV was repeated but the amount of polymethylene polyphenyl isocyanate used was increased to 1/50 molar and the reaction was initiated at 170° C. The resulting polycaprolactam product had tensile impact strength of 240 ft. lbs./sq. in. and a tensile strength of 11,500 lbs./sq. in.

As can be seen from the above examples, the use of polymethylene polyphenyl isocyanate as a promoter compound readily facilitated the production of polylactam having tensile strengths in excess of 9,000 lbs./sq. in., as is conventional in the prior art, and having tensile impact strengths well in excess of 150 ft. lbs./sq. in.

I claim:

1. A composition of matter consisting essentially of the polylactam product of the low temperature anionic polymerization of a higher lactam having at least 6 carbon atoms in the lactam ring in the presence of an anionic catalyst and of polymethylene polyphenyl isocyanate promoters having the general formula:

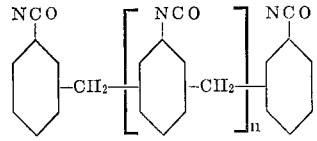

where $n$ is an average number from about ½ up to about 8, said polymethylene polyphenyl isocyanate being present in about 0.01 to about 20 molar percent of the weight of the higher lactam, and said product having a tensile strength in excess of 9,000 pounds per square inch and a tensile impact strength in excess of 150 pounds per square inch.

2. A composition of matter consisting essentially of the polylactam product of the polymerization of lactams having 6 to 12 carbon atoms in the lactam ring at about 125° to about 200° C. in the presence of an anionic catalyst and of polymethylene polyphenyl isocyanate promoters of the general formula:

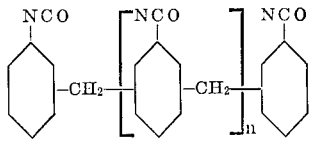

where $n$ is an average number from about ½ up to about 8, said polymethylene polyphenyl isocyanate being present in from about 0.01 to about 20 molar percent of the weight of said lactam, and said product having a tensile strength in excess of 9,000 pounds per square inch and a tensile impact strength in excess of 150 pounds per square inch.

3. The composition of claim 1 wherein $n$ is an average number from about 1 to about 3.

References Cited

UNITED STATES PATENTS

| | | | |
|---|---|---|---|
| 3,028,369 | 4/1962 | Butler et al. | 260—78 |
| 3,148,174 | 9/1964 | Gliekman et al. | 260—78 |

WILLIAM H. SHORT, *Primary Examiner.*

HAROLD D. ANDERSON, *Assistant Examiner.*